United States Patent
Jeon

(10) Patent No.: US 12,537,718 B2
(45) Date of Patent: Jan. 27, 2026

(54) WIRELESS COMMUNICATION APPARATUS FOR ADAPTIVE BEAMFORMING AND OPERATING METHOD THEREOF

(71) Applicant: SAMSUNG ELECTRONICS CO., LTD., Suwon-si (KR)

(72) Inventor: Eunsung Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 130 days.

(21) Appl. No.: 18/386,894

(22) Filed: Nov. 3, 2023

(65) Prior Publication Data

US 2024/0154842 A1    May 9, 2024

(30) Foreign Application Priority Data

Nov. 4, 2022 (KR) .................. 10-2022-0146387
Jan. 6, 2023 (KR) .................. 10-2023-0002516
Mar. 14, 2023 (KR) .................. 10-2023-0033458

(51) Int. Cl.
*H04L 25/02* (2006.01)
*H04B 7/0426* (2017.01)
*H04B 17/336* (2015.01)

(52) U.S. Cl.
CPC .......... *H04L 25/0202* (2013.01); *H04B 7/043* (2013.01); *H04B 17/336* (2015.01)

(58) Field of Classification Search
CPC . H04L 25/0202; H04L 25/0254; H04B 7/043; H04B 17/336; H04B 7/0452
See application file for complete search history.

(56) References Cited

U.S. PATENT DOCUMENTS

| | | | |
|---|---|---|---|
| 8,594,216 B2 * | 11/2013 | Van Zelst | H04B 7/0617 375/267 |
| 10,700,757 B2 | 6/2020 | Singh et al. | |
| 10,979,122 B2 * | 4/2021 | Jeon | H04B 7/0456 |
| 11,101,867 B2 | 8/2021 | Liu | |
| 11,395,159 B2 | 7/2022 | Lee et al. | |
| 11,405,084 B1 * | 8/2022 | Changlani | H04L 5/0048 |

(Continued)

FOREIGN PATENT DOCUMENTS

| | | | | |
|---|---|---|---|---|
| KR | 10-2022-0086447 A | 6/2022 | | |
| KR | 10-2022-0107153 A | 8/2022 | | |
| WO | WO-2024083303 A1 * | 4/2024 | ............... | G06N 3/02 |

OTHER PUBLICATIONS

Machine translation of JP-2014502091-A (Year: 2014).*

(Continued)

*Primary Examiner* — Jean B Corrielus
(74) *Attorney, Agent, or Firm* — Sughrue Mion, PLLC

(57) ABSTRACT

Provided is an operating method of a first apparatus communicating with a second apparatus in a wireless local area network (WLAN) system including the first apparatus and the second apparatus. The operating method of the first apparatus includes obtaining channel characteristic data with the second apparatus based on a null data packet (NDP) frame received from the second apparatus; generating beamforming feedback information and a feedback frame based on a class of a channel determined by applying a machine learning algorithm to the channel characteristic data; and transmitting the feedback frame to the second apparatus.

20 Claims, 14 Drawing Sheets

(56) References Cited

U.S. PATENT DOCUMENTS

| | | | |
|---|---|---|---|
| 2010/0239037 A1* | 9/2010 | Tang | H04B 7/0639 |
| | | | 375/260 |
| 2020/0007204 A1* | 1/2020 | Jeon | H04B 7/0486 |
| 2020/0053591 A1* | 2/2020 | Prasad | H04W 28/0268 |
| 2020/0304194 A1* | 9/2020 | Jeon | H04B 7/0617 |
| 2021/0250068 A1 | 8/2021 | Lee et al. | |
| 2021/0281356 A1 | 9/2021 | Perez-Ramirez et al. | |
| 2021/0367702 A1 | 11/2021 | Fang et al. | |
| 2022/0014246 A1 | 1/2022 | Zhu et al. | |
| 2022/0190896 A1 | 6/2022 | Jeon | |
| 2022/0393781 A1 | 12/2022 | Kim et al. | |

OTHER PUBLICATIONS

Ernest Kurniawan et al., "Machine Learning-Based Channel Classification and Its Application to IEEE 802.11ad Communications", GLOBECOM 2017—2017 IEEE Global Communications Conference, Dec. 1, 2017, pp. 1-6, DOI: 10.1109/GLOCOM.2017.8254052.

Hüseyin Arslan et al., "Delay Spread Estimation for Wireless Communication Systems", Proceedings of the Eighth IEEE Symposium on Computers and Communications (ISCC'03), 2003, pp. 282-287, DOI: 10.1109/ISCC.2003.1214135.

IEEE P802.11ac™/D2.0, Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz, Prepared by the 802.11 Working Group of the 802 Committee, Jan. 2012, 359 pages.

IEEE P802.11ax™/D6.1 (amendment to IEEE P802.11REVmd/D3.2), Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, Prepared by the 802.11 Working Group of the LAN/MAN Standards Committee of the IEEE Computer Society, May 2020, 784 pages.

IEEE Std 802.11—2012 (Revision of IEEE Std 802.11-007), IEEE Standard for Information technology—Telecommunications and information exchange between systems, Local and metropolitan area networks—Specific requirements, Part 11: Wireless LAN Medium Access Control (MAC) and Physical Layer (PHY) Specifications, Sponsor by LAN/MAN Standards Committee of the IEEE Computer Society, Mar. 29, 2012, 2793 pages.

Mrugen Deshmukh et al., "Intelligent Feedback Overhead Reduction (iFOR) in Wi-Fi 7 and Beyond", 2022 IEEE 95th Vehicular Technology Conference (VTC2022—Spring), 2022, pp. 1-5, DOI: 10.1109/VTC2022-Spring54318.2022.9860553.

* cited by examiner

FIG. 3A

| Class | Feature | Codebook | bits for ($\phi$, $\psi$) |
|---|---|---|---|
| Class I | Frequency flat channel | Coarse codebook | (2, 4) |
| Class II | Frequency selective channel | Fine codebook | (4, 6) |

FIG. 3B

| Class | Feature | Codebook | bits for ($\phi$, $\psi$) |
|---|---|---|---|
| Class I | Frequency flat channel | Coarse codebook | (2, 4) |
| Class II | Low frequency selective channel | Low fine codebook | (4, 6) |
| Class III | High frequency selective channel | High fine codebook | (6, 8) |

FIG. 9A

| Class | Feature | IEEE channel Model | $N_g$ |
|---|---|---|---|
| Class I | Frequency flat channel | A | $N_g = 16$ |
| Class II | Low frequency selective channel | B, C, D, E, F | $N_g = 4$ |

FIG. 9B

| Class | Feature | IEEE channel Model | $N_g$ |
|---|---|---|---|
| Class I | Frequency flat channel | A | $N_g = N_{ST}$ |
| Class II | Low frequency selective channel | B, C | $N_g = 16$ |
| Class III | High frequency selective channel | D, E, F | $N_g = 4$ |

| Class | 20 MHz | 40 MHz | 80 MHz | 80+80 MHz | 160 MHz |
|---|---|---|---|---|---|
| $N_{ST}$ | 242 | 484 | 996 | 1992 | 3984 |

WIRELESS COMMUNICATION APPARATUS FOR ADAPTIVE BEAMFORMING AND OPERATING METHOD THEREOF

CROSS-REFERENCE TO RELATED APPLICATIONS

This application is based on and claims priority under 35 U.S.C. § 119 to Korean Patent Application No. 10-2022-0146387, filed on Nov. 4, 2022, Korean Patent Application No. 10-2023-0002516, filed on Jan. 6, 2023, and Korean Patent Application No. 10-2023-0033458, filed on Mar. 14, 2023, in the Korean Intellectual Property Office, the disclosures of which are incorporated by reference herein in their entireties.

BACKGROUND

The present disclosure relates to wireless communication, and more particularly, to a wireless communication apparatus supporting beamforming feedback by using machine learning, and an operating method of the wireless communication apparatus.

A wireless local area network (WLAN), which is an example of wireless communication, links two or more apparatuses by using a wireless signal transmission method. For example, a WLAN technology may be based on and/or may conform to a wireless communication standard, such as, but not limited to an Institute of Electrical and Electronics Engineers (IEEE) 802.11 standard. The 802.11 standard may refer to several versions of the standard (e.g., 802.11b, 802.11a, 802.11g, 802.11n, 802.11ac, 802.11ax, and the like), which may support a transmission rate of up to 1 gigabyte/second based on orthogonal frequency-division multiplexing (OFDM).

In a WLAN based on the IEEE 802.11ac standard, data may be simultaneously transmitted to a plurality of users through a multi-user multi-input multi-output (MU-MIMO) scheme. In another WLAN based on the IEEE 802.11be standard, which may be referred to as extremely high throughput (EHT), and/or a next-generation protocol standard after EHT (e.g., EHT+), the WLAN may provide support for a six (6) gigahertz (GHz) unlicensed frequency band, utilization of bandwidth of up to 320 megahertz (MHz) per channel, introduction of hybrid automatic repeat and request (HARM), and/or support for up to 16×16 MIMO.

Also, in a MU-MIMO communication environment of a related WLAN, a beamforming process may be used to potentially improve communication performance. For example, a beamformer (or an access point) that performs a beamforming process may perform beamforming based on feedback on a channel received from a beamformee (or a station).

There exists a need for further improvements in wireless communication technology, as the need for improvements in the performance of a wireless communication system may be constrained by a lack of support of beamforming technology by a wireless communication apparatus. Alternatively or additionally, there may be a need for a beamforming feedback generation method for a wireless communication apparatus that may provide for a base station (or access point) to perform beamforming that may be suitable for a channel state of the wireless communication apparatus.

SUMMARY

Example embodiments provide a wireless communication apparatus that may adaptively adjust beamforming feedback resources by using machine learning in a wireless communication system, and an operating method of the wireless communication apparatus.

According to an aspect of an example embodiment, an operating method of a first apparatus communicating with a second apparatus through a wireless local area network (WLAN) is provided. The operating method includes obtaining channel characteristic data with the second apparatus based on a null data packet (NDP) frame received from the second apparatus; generating beamforming feedback information and a feedback frame based on a class of a channel determined by applying a machine learning algorithm to the channel characteristic data; and transmitting the feedback frame to the second apparatus.

According to an aspect of an example embodiment, an operating method of a second apparatus communicating with a first apparatus through a WLAN is provided. The operating method includes transmitting an NDP frame to the first apparatus; receiving a channel information frame from the first apparatus; obtaining channel characteristic data with the first apparatus based on the channel information frame; generating beamforming feedback information based on a class of a channel determined by applying a machine learning algorithm to the channel characteristic data; and transmitting the beamforming feedback information to the first apparatus.

According to an aspect of an example embodiment, a first apparatus communicating with a second apparatus through a WLAN is provided. The first apparatus includes a processing circuit configured to obtain channel characteristic data based on an NDP frame received from the second apparatus, and generate beamforming feedback information and a feedback frame based on a class of a channel determined by applying a machine learning algorithm to the channel characteristic data, wherein the processing circuit is further configured to control a transceiver to transmit the feedback frame to the second apparatus.

BRIEF DESCRIPTION OF THE DRAWINGS

The above and other aspects, features, and advantages of certain embodiments of the present disclosure may be more apparent from the following description taken in conjunction with the accompanying drawings, in which:

FIGS. 3A and 3B illustrate tables describing codebook size information, according to an embodiment;

FIGS. 9A and 9B illustrate tables depicting subcarrier grouping information, according to an embodiment;

DETAILED DESCRIPTION

Hereinafter, various embodiments of the present disclosure are described with reference to the accompanying drawings.

Figure 1:
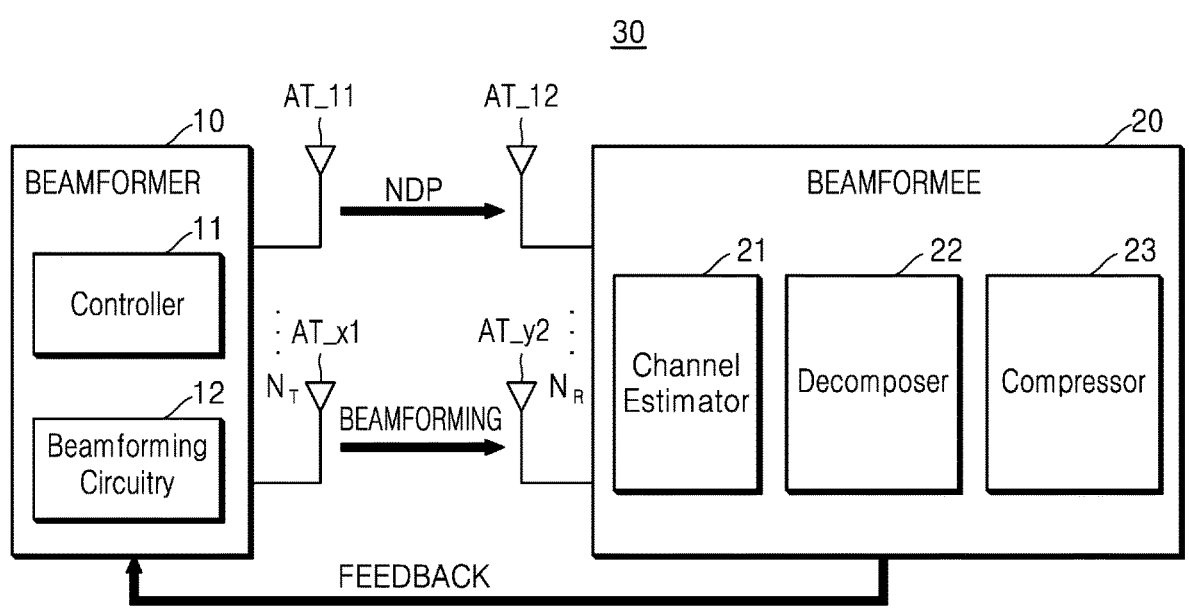
FIG. 1 is a block diagram illustrating a wireless communication system, according to an embodiment.

FIG. 1 is a block diagram illustrating a wireless communication system, according to an embodiment.

The block diagram of FIG. 1 illustrates a beamformer 10 and a beamformee 20 communicating with each other in a wireless communication system 30. Each of the beamformer 10 and the beamformee 20 may be and/or may include an apparatus communicating in the wireless communication system 30. In an embodiment, each of the beamformer 10 and the beamformee 20 may be referred to as an apparatus for wireless communication. In some embodiments, each of the beamformer 10 and the beamformee 20 may be and/or may include an access point and/or a station of a wireless local area network (WLAN) system, such as the wireless communication system 30.

Referring to FIG. 1, the beamformer 10 may include a controller 11, a beamforming circuit 12, and a plurality of first antennas AT_11 to AT_x1, where x is a positive integer greater than zero (0). The controller 11 and the beamforming circuit 12 may be referred to as a processing circuit of the beamformer 10. The beamformee 20 may include a channel estimator 21, a decomposer 22, a compressor 23, and a plurality of second antennas AT_12 to AT_y2, where y is a positive integer greater than zero (0). The channel estimator 21, the decomposer 22, and the compressor 23 may be referred to as a processing circuit of the beamformee 20.

In an embodiment, the beamformee 20 may receive a null data packet (NDP) frame through the plurality of second antennas AT_12 to AT_y2. The channel estimator 21 may estimate a channel by using a reference signal included in the received NDP frame. In some embodiments, the NDP frame may be referred to as a sounding packet. The NDP frame $y_k$ received by the channel estimator 21 for channel estimation may be expressed by an equation similar to Equation 1.

$$y_k = H_k x_k + n_k \quad \text{(Eq. 1)}$$

Referring to Eq. 1, $H_k$ may represent a channel matrix, $x_k$ may represent a transmission data stream, and $n_k$ may denote thermal noise. k may represent a subcarrier index of a channel, and may have a range of one (1) to $N_{FFT}$. Accordingly, a size of $H_k$ for each subcarrier may be $N_r \times N_t$, where $N_r$ may represent the number of second antennas AT_12 to AT_y2, and $N_t$ may represent the number of first antennas AT_11 to AT_x1. Each element of Eq. 1 may be defined as a matrix and/or a vector. The transmission data stream $x_k$ may have a size of, for example, $N_t \times 1$, where $N_t$ may represent the number of transmission streams. The thermal noise $n_k$ may refer to white Gaussian noise. The thermal noise $n_k$ may have a size of $N_r \times 1$.

In an embodiment, the channel estimator 21 may generate channel state information based on the estimated channel. For example, the channel state information may include at least one of a channel quality indicator (CQI), a precoding matrix indicator (PMI), or a rank indicator (RI).

In some embodiments, a class of a channel between the beamformer 10 and the beamformee 20 may be classified into a plurality of classes. For example, in a binary-level classification, a class may be classified into a first channel class (e.g., additive white Gaussian noise (AWGN) and Ch.A of an IEEE 802.11ac/ax/be WLAN system) and a second channel class (e.g., Ch.B, Ch.C, Ch.D, Ch.E, and Ch.F of an IEEE 802.11ac/ax/be WLAN system). In such an example, the second channel class may have a greater multipath fading than the first channel class. Multipath fading may refer to interference that may occur due to signals that may be received along different paths may have different amplitudes and/or phases due to reflection, and the like.

In contrast, in the case of multi-level classification, a class may be classified into a first channel class (e.g., AWGN and Ch.A of the IEEE 802.11ac/ax/be WLAN system), a second channel class (e.g., Ch.B and Ch.C of the IEEE 802.11ac/ax/be WLAN system), and a third channel class (e.g., Ch.D, Ch.E, and Ch.F of the IEEE 802.11ac/ax/be WLAN system). In such an example, the second channel class may have a greater multipath fading than the first channel class, and the third channel class may have greater multipath fading than the second channel class.

Although a class of a channel has been described as being in a binary-level classification and/or a multi-level classification, the present disclosure is not limited thereto. For example, the number of channel classes and/or the classification methods may be set differently (e.g., different numbers of classes, different classification methods).

In some embodiments, the beamformee 20 may obtain first channel characteristic data from the channel estimated based on the NDP frame. The first channel characteristic data may refer to data for determining a class of a channel. The first channel characteristic data may include at least one of a variance of a channel frequency response, a channel delay spread, or a signal-to-noise ratio (SNR) of a channel.

The variance $\sigma_H^2$ of the channel frequency response may be represented as an equation similar to Equation 2.

$$\sigma_H^2 = \frac{1}{N_r N_t} \sum_{i=0}^{N_r-1} \sum_{j=0}^{N_t-1} \left[ \frac{1}{N} \sum_{k=0}^{N-1} |\hat{H}_k(i,j)|^2 - \left( \frac{1}{N} \sum_{k=0}^{N-1} |\hat{H}_k(i,j)| \right)^2 \right] \quad \text{(Eq. 2)}$$

Referring to Equation 2, $\hat{H}_k(i, j)$ may represent an $(i, j)^{th}$ element of a channel matrix estimated by using the NDP frame.

The channel delay spread $\tau_H$ may be represented as an equation similar to Equation 3.

$$\tau_H = \frac{1}{N_r N_t} \sum_{i=0}^{N_r-1} \sum_{j=0}^{N_t-1} [IDFT\{\phi_\Delta(i,j)\}], \quad \text{(Eq. 3)}$$

where $\phi_\Delta(i, j) = E\{\hat{H}^*_k(i, j)\hat{H}_{k+\Delta}(i, j)\}$

Referring to Equation 3, IDFT may represent an inverse discrete Fourier transform, $\Delta$ may represent a subcarrier index, $\hat{H}^*_k(i,j)$ may represent a complex conjugate of $\hat{H}_k(i, j)$, and $E\{\ldots\}$ may represent an arithmetic mean operator.

The SNR of the channel may be represented as an equation similar to Equation 4.

$$SNR = 10 \log_{10}\left(\frac{P_S}{P_N}\right) \quad \text{(Eq. 4)}$$

Referring to Equation 4, $P_N$ may represent a power of thermal noise, and $P_S$ may represent a power of the NDP frame received by the beamformee 20.

In some embodiments, the beamformee 20 may determine a class of a channel by applying a machine learning algorithm to the first channel characteristic data. An example of an operation of the machine learning algorithm is described with reference to FIGS. 6 to 8. The beamformee 20 may generate beamforming feedback information based on a determination result obtained from the machine learning algorithm. The beamforming feedback information may refer to information about feedback frame resources.

The beamforming feedback information may include subcarrier grouping information and codebook size information. The subcarrier grouping information may refer to information used to group a specific number of subcarriers. The subcarrier grouping information is described with reference to FIG. 2.

The codebook size information may refer to the number of bits corresponding to quantization angle information described below with reference to FIG. 1. Also, as described with reference to FIG. 4, a resolution of a demodulated signal of a fine codebook having a large codebook size may be higher than another resolution of a coarse codebook having a small codebook size.

The beamformee 20 may generate a feedback frame according to the beamforming feedback information. For example, when the subcarrier grouping information has information corresponding to four (4), the beamformee 20 may generate a feedback frame by grouping four (4) subcarriers.

Also, when the codebook size information has information corresponding to a fine codebook, the beamformee 20 may generate a feedback frame having a larger codebook size than in a coarse codebook.

Accordingly, the beamformee 20 may adjust feedback frame resources according to the class of the channel, and may reduce beamforming feedback overhead.

The decomposer 22 may perform singular value decomposition on the channel $\hat{H}_{est,k}$ estimated by the channel estimator 21 using an equation similar to Equation 5.

$$\hat{H}_{est,k} = U_k \Sigma_k V_k^H \quad \text{(Eq. 5)}$$

Referring to Equation 5, $U_k$ may represent a left singular matrix, and $V_k$ may represent a right singular matrix, and may include a Hermitian operator. $\Sigma_k$ may represent a diagonal matrix including non-negative singular values.

A size of the left singular matrix $U_k$ may be $N_r \times N_{SS}$. A size of the right singular matrix $V_k$ may be $N_t \times N_{SS}$. Also, a size of $\Sigma_k$ may be $N_{SS} \times N_{SS}$. The right singular matrix $V_k$ may be referred to as an initial beam steering matrix. In a wireless communication system 30 (e.g., an IEEE 802.11ac/ax/be WLAN system), according to some embodiments, because the beamformer 10 may transmit a signal to the beamformee 20 through orthogonal frequency-division multiplexing (OFDM) modulation in which $N_{FFT}$ subcarriers in one symbol may be guaranteed to be orthogonal to each other, a channel estimation operation of the channel estimator 21 and a singular value decomposition operation of the decomposer 22 may be performed for each subcarrier.

The decomposer 22 may apply a diagonal matrix D for performing a common phase shift to the initial beam steering matrix $V_k$ using an equation similar to Equation 6, without transmitting the initial beam steering matrix $V_k$ to the beamformer 10 in order to reduce feedback overhead transmitted to the beamformer 10.

$$Q_k = V_k D \quad \text{(Eq. 6)}$$

Referring to Eq. 6, $Q_k$ may represent a beam steering matrix, and a first diagonal matrix D may represent a matrix for allowing an element of a last row of each column of the beam steering matrix $Q_k$ to have a real value. For example, the first diagonal matrix D may be $$\left(e^{-j\phi(N_{tx},1)}, \ldots, e^{-j\phi(N_{tx}-1, N_{tx}-1)}\right),$$

where $$e^{-j\phi(N_{tx},1)}$$

may represent a phase value of an element corresponding to an $N_{tx}^{th}$ row and a first column of the initial beam steering matrix $V_k$. In some embodiments, the first diagonal matrix D may include a phase value of an element of a last row of each column of the initial beam steering matrix $V_k$.

The compressor 23 may obtain angle information $\phi$, $\psi$ about the beam steering matrix $Q_k$ generated by the decomposer 22 using equations similar to Equations 7 to 9.

$$Q_k = \left[\prod_{i=1}^{min(N_r, N_t-1)} \left[D_i(1_{i-1}, e^{j\phi_{i,i}}, \ldots, e^{j\phi_{N_t-1,i}}, 1) \prod_{l=i+1}^{N_t} G_{li}^T(\psi_{li})\right]\right] \check{I}_{Nt \times Nr} \quad \text{(Eq. 7)}$$

Referring to Equation 7, $1_{i-1}$ may represent a vector including 1s having a length i−1. $\check{I}_{Nt \times Nr}$ may represent an identity matrix having a size of $N_t \times N_r$.

Continuing to refer to Equation 7, $$D_i(1_{i-1}, e^{j\phi_{i,i}}, \ldots, e^{j\phi_{N_t-1,i}}, 1)$$

may be expressed as a second diagonal matrix using an equation similar to Equation 8.

$$D_i(1_{i-1}, e^{j\phi_{i,i}}, \ldots, e^{j\phi_{N_t-1,i}}, 1) = \begin{bmatrix} I_{i-1} & 0 & \ldots & \ldots & 0 \\ 0 & e^{j\phi_{i,i}} & 0 & \ldots & 0 \\ \vdots & 0 & \ddots & 0 & 0 \\ \vdots & \vdots & 0 & e^{j\phi_{N_t-1,i}} & 0 \\ 0 & 0 & 0 & 0 & 1 \end{bmatrix} \quad \text{(Eq. 8)}$$

Continuing to refer to Equation 7, $G_{li}(\psi)$ may represent a Givens rotation matrix and may be expressed using an equation similar to Equation 9.

$$G_{li}(\psi) = \begin{bmatrix} I_{i-1} & 0 & 0 & \ldots & 0 \\ 0 & \cos(\psi) & 0 & \sin(\psi) & 0 \\ 0 & 0 & I_{l-i-1} & 0 & 0 \\ 0 & -\sin(\psi) & 0 & \cos(\psi) & 0 \\ 0 & 0 & 0 & 0 & I_{Nt-1} \end{bmatrix} \quad \text{(Eq. 9)}$$

The compressor 23 may generate quantization angle information by quantizing the obtained angle information $\phi$, $\psi$. Pieces of quantization angle information $\hat{\phi}$ and $\hat{\psi}$ may be respectively quantized using equations similar to Equations 10 and 11.

$$\hat{\phi} = \frac{n\pi}{2^{b_\phi-1}} + \frac{\pi}{2^{b_\phi}}, n = 1, 2, \ldots 2^{b_\phi-1} \quad \text{(Eq. 10)}$$

Referring to Equation 10, $b_\phi$ may represent the number of bits used to quantize $\phi$.

$$\hat{\psi} = \frac{n\pi}{2^{b_\psi-1}} + \frac{\pi}{2^{b_\psi}}, n = 1, 2, \ldots 2^{b_\psi-1} \quad \text{(Eq. 11)}$$

Referring to Equation 11, $b_\psi$ may denote the number of bits used to quantize $\psi$.

The compressor 23, according to an embodiment, may generate a feedback frame including the quantization angle information. As used herein, the quantization angle information may be referred to as information about the channel estimated by the channel estimator 21. In an embodiment, the beamformee 20 may transmit the feedback frame to the beamformer 10 through a transceiver and the plurality of second antennas AT_12 to AT_y2 of the beamformee 20.

The beamformer 10 may receive the feedback frame from the beamformee 20 through a transceiver and the plurality of first antennas AT_11 to AT_x1. The controller 11 may control an overall operation for communication of the beamformer 10. For example, the controller 11 may generate the NDP frame, and/or may process information included in the feedback frame so that the beamforming circuit 12 may use the information.

The beamforming circuit 12, according to an embodiment, may determine beamforming matrices for performing beamforming according to the information included in the feedback frame.

The beamformer 10 may transmit a signal beamformed according to the beamforming matrices determined by the beamforming circuit 12 to the beamformee 20 through the transceiver and the first antennas AT_11 to AT_x1.

In another embodiment, the beamformer 10 may generate beamforming feedback information. For example, according to the IEEE 802.11ac/ax/be standard, in a case of multi-user beamforming (e.g., MU-MIMO), the beamformer 10 may generate beamforming feedback information and may transmit the beamforming feedback information to the beamformee 20. The beamformee 20 may generate a feedback frame according to the received beamforming feedback information. In contrast, in a case of single-user beamforming, the beamformee 20 may generate beamforming feedback information similar to the above-described embodiment.

When the beamformer 10 generates the beamforming feedback information, the beamformee 20 may generate a channel information frame by using the reference signal included in the NDP frame received from the beamformer 10. The beamformer 10 may receive the channel information frame from the beamformee 20. The beamformer 10 may obtain second channel characteristic data based on the channel information frame. The second channel characteristic data may refer to data for determining a class of a channel as described above. The second channel characteristic data may include at least one of a variance of a channel frequency response, a channel delay spread, or an SNR of a channel, similar to the first channel characteristic data.

The beamformer 10 may determine a class of a channel by applying a machine learning algorithm to the second channel characteristic data. An example operation of the machine learning algorithm is described with reference to FIGS. 13 and 14. The beamformer 10 may generate beamforming feedback information based on a determination result. In an embodiment, the beamforming feedback information may include subcarrier grouping information and codebook size information as described previously.

The beamformer 10 may transmit the beamforming feedback information to the beamformee 20. In an embodiment, the beamformee 20 may generate a feedback frame according to the beamforming feedback information. For example, when the subcarrier grouping information has information corresponding to four (4), the beamformee 20 may generate a feedback frame by grouping four (4) subcarriers.

Also, when the codebook size information has information corresponding to a fine codebook, the beamformee 20 may generate a feedback frame having a larger codebook size than in a coarse codebook.

Accordingly, the beamformee 20 may efficiently adjust feedback frame resources according to the class of the channel, and may reduce beamforming feedback overhead.

Figure 2:
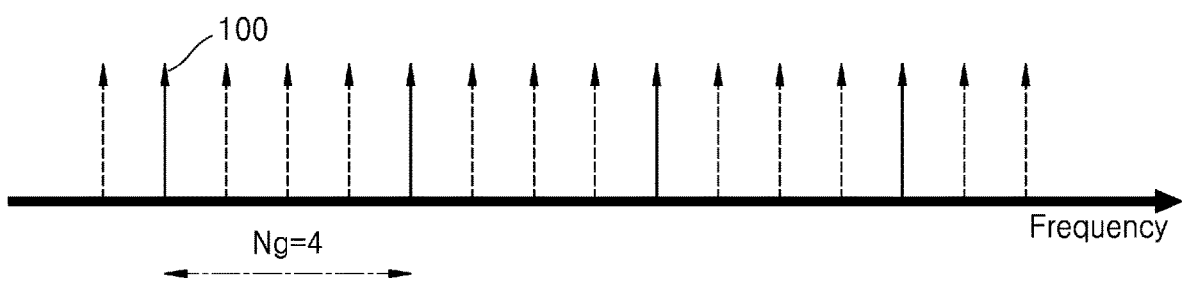
FIG. 2 is a diagram depicting a subcarrier grouping, according to an embodiment.
Figure 4:
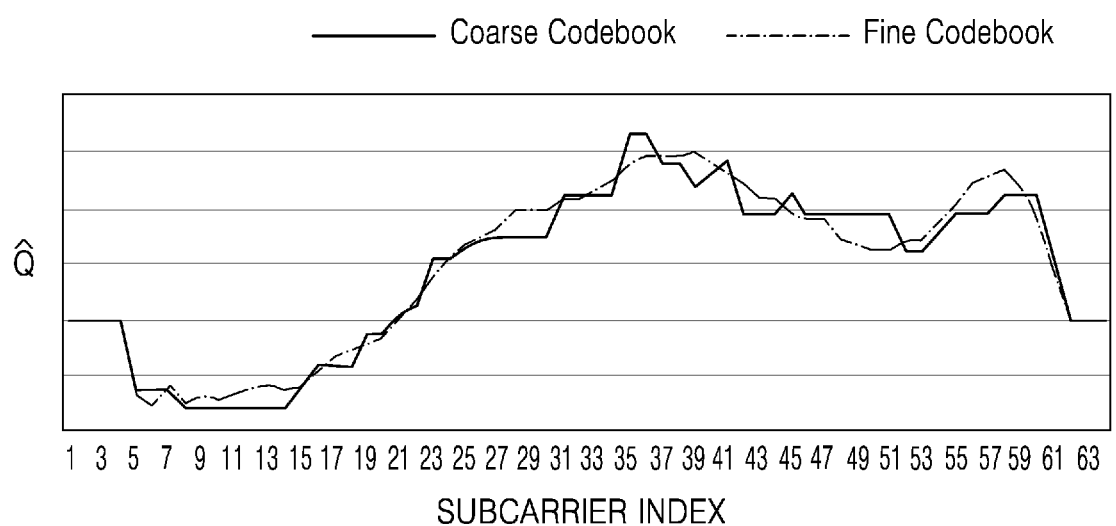
FIG. 4 is a diagram illustrating a resolution of a beam steering matrix, according to an embodiment.

FIG. 2 is a diagram depicting subcarrier grouping, according to an embodiment. FIGS. 2 to 4 are described with reference to FIG. 1.

Subcarrier grouping may refer to technology used in a WLAN standard, such as, but not limited to IEEE 802.11ac/ax/be. Subcarrier grouping may refer to the beamformee 20 feeding back quantization angle information corresponding to only some subcarriers without feeding back quantization angle information corresponding to all subcarriers by using channel frequency correlations.

When subcarrier grouping information Ng is determined, the beamformee 20 may feed back, to the beamformer 10, quantization angle information corresponding to one subcarrier 100 from among consecutive subcarriers of the subcarrier grouping information Ng. The subcarrier grouping information Ng may be determined by the beamformer 10 and/or the beamformee 20. When the beamformer 10 generates beamforming feedback information, for example, in a case of multi-user beamforming, the beamformer 10 may transmit the subcarrier grouping information Ng to the beamformee 20. The beamformee 20 may feed back quantization angle information according to the received subcarrier grouping information Ng. In contrast, when the beamformee 20 generates beamforming feedback information, for example, in a case of single-user beamforming, the beamformee 20 may set the subcarrier grouping information Ng by itself.

The beamformer 10 may receive quantization angle information according to the subcarrier grouping information Ng from the beamformee 20, and then may infer quantization angle information for the remaining subcarriers by using interpolation. For example, the IEEE 802.11ac may define subcarrier grouping information Ng as having a value of one (1), two (2), or four (4). Alternatively or additionally, the IEEE 802.11ax/be may define subcarrier grouping information Ng as having a value of four (4) or sixteen (16). However, the present disclosure is not limited in this regard, for example, the subcarrier grouping information Ng may be set to other values.

FIGS. 3A and 3B illustrate tables describing codebook size information, according to an embodiment. As described with reference to FIG. 1, codebook size information may refer to the numbers of bits $b_\phi$ and $b_\psi$ corresponding to quantization angle information.

FIG. 3A illustrates codebook size information in a case of binary-level classification according to the IEEE 802.11ac/ax/be standard. FIG. 3B illustrates codebook size information in a case of multi-level classification.

Referring to FIG. 3A, in the case of a first channel class, two (2) and four (4) bits corresponding to a coarse codebook may be allocated as the numbers of bits $b_\phi$ and $b_\psi$ of quantization angle information. A channel corresponding to the coarse codebook may be a frequency flat channel in which multipath fading may occur over a wide frequency band.

As further shown in FIG. 3A, in a case of a second channel class, four (4) and six (6) bits corresponding to a fine codebook may be allocated as the numbers of bits $b_\phi$ and $b_\psi$ of quantization angle information. A channel corresponding to the fine codebook may have a frequency selective channel in which multipath fading may occur in a specific frequency band.

Referring to FIG. 3B, in a case of a first channel class, two (2) and four (4) bits corresponding to a coarse codebook may be allocated as the numbers of bits $b_\phi$ and $b_\psi$ of quantization angle information. A channel corresponding to the coarse codebook may be and/or may include a frequency flat channel.

In a case of a second channel class, four (4) and six (6) bits corresponding to a low fine codebook may be allocated as the numbers of bits $b_\phi$ and $b_\psi$ of quantization angle information. A channel corresponding to the low fine codebook may be a low frequency selective channel in which multipath fading occurs in a specific frequency band.

In a case of a third channel class, six (6) and eight (8) bits corresponding to a high fine codebook may be allocated as the numbers of bits $b_\phi$ and $b_\psi$ of quantization angle information. A channel corresponding to the high fine codebook may be a high frequency selective channel in which multipath fading may occur in a narrower frequency band than in the low fine codebook.

FIG. 4 is a diagram depicting a resolution of a beam steering matrix, according to an embodiment. FIG. 4 illustrates a demodulated beam steering matrix $\hat{Q}$ according to a subcarrier index. The demodulated beam steering matrix $\hat{Q}$ may refer to a beam steering matrix generated when the beamformer 10 demodulates pieces of quantization angle information received from the beamformee 20.

Referring to FIG. 4, a resolution of a beam steering matrix in a case of a coarse codebook may be lower than the resolution in a fine codebook, and thus, the amount of information lost in a demodulation process may be large. However, because a fine codebook requires more bits than a coarse codebook as described with reference to FIG. 3A, feedback overhead may be greater.

Figure 5:
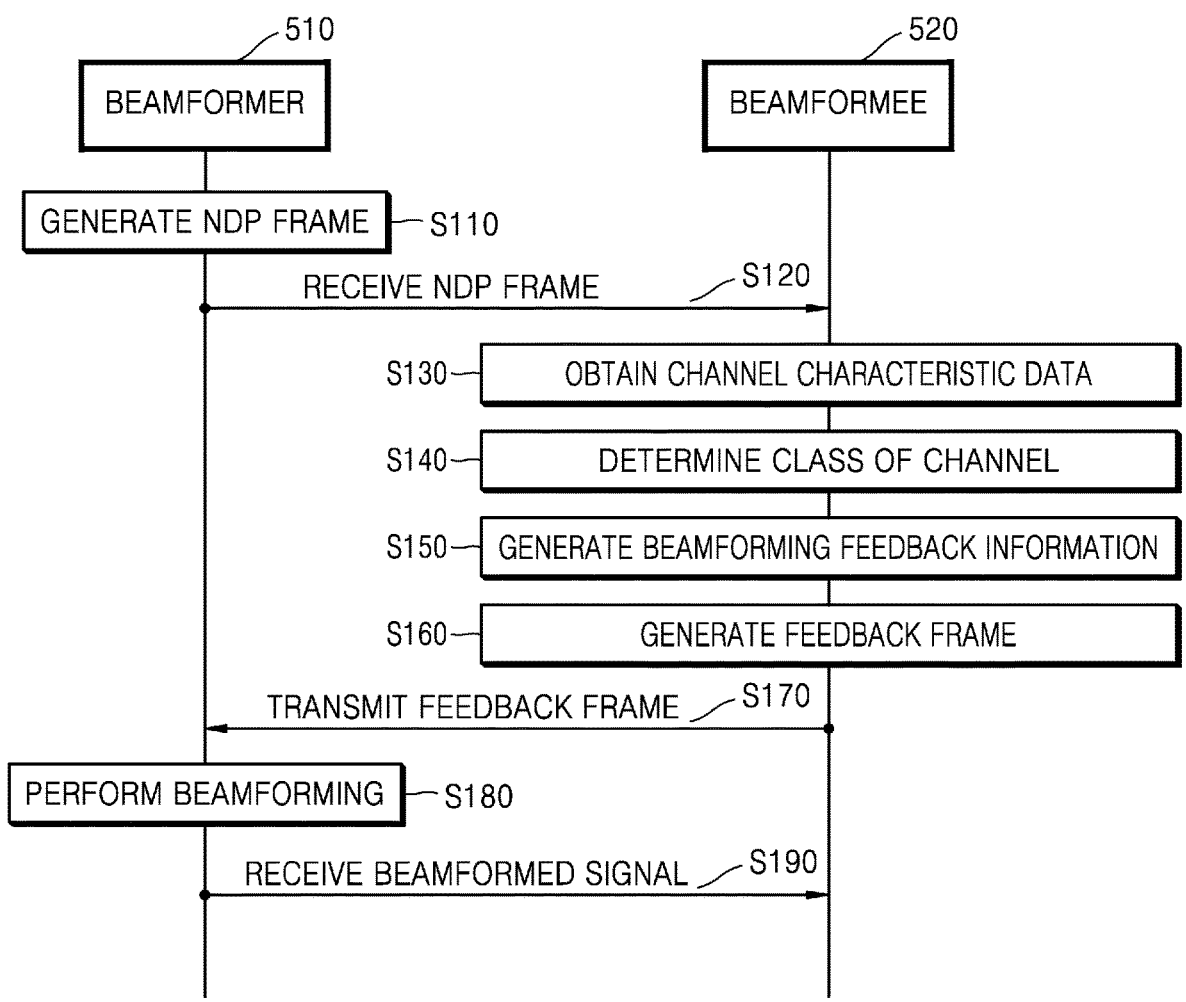
FIG. 5 illustrates signal exchange depicting an operating method of a beamformer and a beamformee, according to an embodiment.

FIG. 5 illustrates signal exchange illustrating an operating method of a beamformer and a beamformee, according to an embodiment. Beamformer 510 and beamformee 520 of FIG. 5 may include and/or may be similar in many respects to the beamformer 10 and the beamformee 20 described above with reference to FIG. 1, respectively, and may include additional features not mentioned above. Consequently, repeated descriptions of the beamformer 510 and beamformee 520 described above with reference to FIG. 1 may be omitted for the sake of brevity.

The signal exchange of FIG. 5 may correspond to an operating method when the beamformee 520 generates beamforming feedback information, for example, in a case of single-user beamforming. Also, the signal exchange of FIG. 5 shows operations of a beamformer 510 as an access point and a beamformee 520 as a station over time. As shown in FIG. 5, the operating method of the beamformer 510 and the beamformee 520 may include a plurality of operations S110 to S190.

Referring to FIG. 5, in operation S110, the beamformer 510 may generate an NDP frame. The NDP frame may include a reference signal for channel estimation between the beamformer 510 and the beamformee 520.

In operation S120, the beamformee 520 may receive the NDP frame from the beamformer 510.

In operation S130, the beamformee 520 may obtain channel characteristic data based on the NDP frame. The beamformee 520 may obtain the channel characteristic data by estimating a channel by using the reference signal included in the NDP frame. The channel characteristic data may include at least one of a variance of a channel frequency response, a channel delay spread, or an SNR of a channel, as described with reference to FIG. 1.

In some embodiments, operation S130 may include an operation of extracting pieces of information included in the NDP frame by identifying the NDP frame, and an operation of obtaining the channel characteristic data between the beamformee 520 and the beamformer 510 by using the extracted pieces of information.

In operation S140, the beamformee 520 may determine a class of a channel by applying a first machine learning algorithm to the channel characteristic data. The first machine learning algorithm may refer to supervised learning of a machine learning to infer at least one function from training data. The first machine learning algorithm may be and/or may include, for example, a K-nearest neighbor (KNN) algorithm as described with reference to FIGS. 6 and 7, and/or an artificial intelligence network algorithm as described with reference to FIG. 8. The beamformee 520 may determine the class of the channel by applying the first machine learning algorithm to the channel characteristic data. For example, in a case of binary-level classification, the beamformee 520 may determine whether the class of the channel is a first channel class or a second channel class. Alternatively or additionally, in a case of multi-level classification, the beamformee 520 may determine whether the class of the channel is a first channel class, a second channel class, or a third channel class.

In operation S150, the beamformee 520 may generate beamforming feedback information based on a determination result of operation S140. The beamforming feedback information may include subcarrier grouping information and codebook size information.

In operation S160, the beamformee 520 may generate a feedback frame according to the beamforming feedback information. For example, when the subcarrier grouping information has information corresponding to four (4), the beamformee 520 may generate a feedback frame by grouping four (4) subcarriers. Also, when the codebook size information has information corresponding to a fine codebook, the beamformee 520 may generate a feedback frame having a larger codebook size than in a coarse codebook.

In operation S170, the beamformee 520 may transmit the feedback frame to the beamformer 510. The feedback frame may include pieces of quantization angle information.

In operation S180, the beamformer 510 may perform beamforming by demodulating the pieces of quantization angle information included in the feedback frame.

In operation S190, the beamformee 520 may receive a beamformed signal from the beamformer 510.

Figure 6:
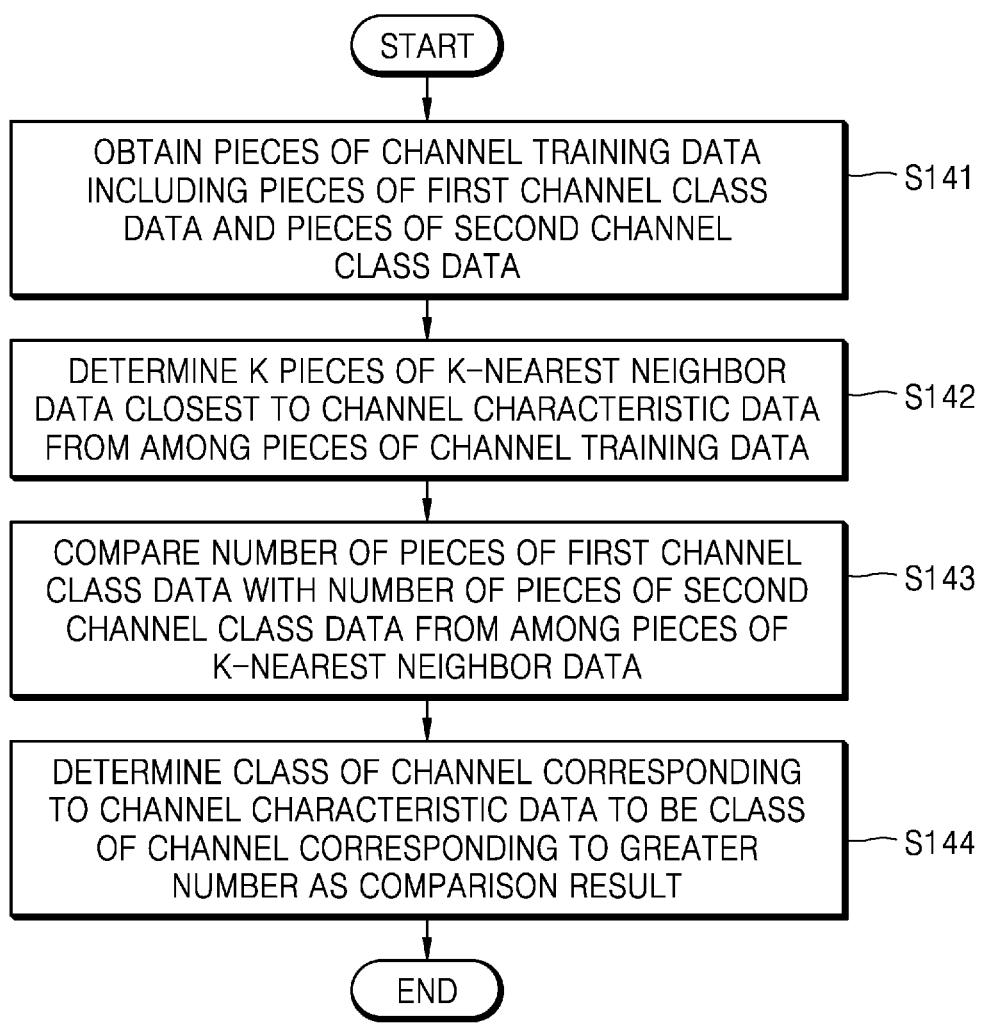
FIG. 6 is a flowchart illustrating a channel class according to a first machine learning algorithm, according to an embodiment.
Figure 7:
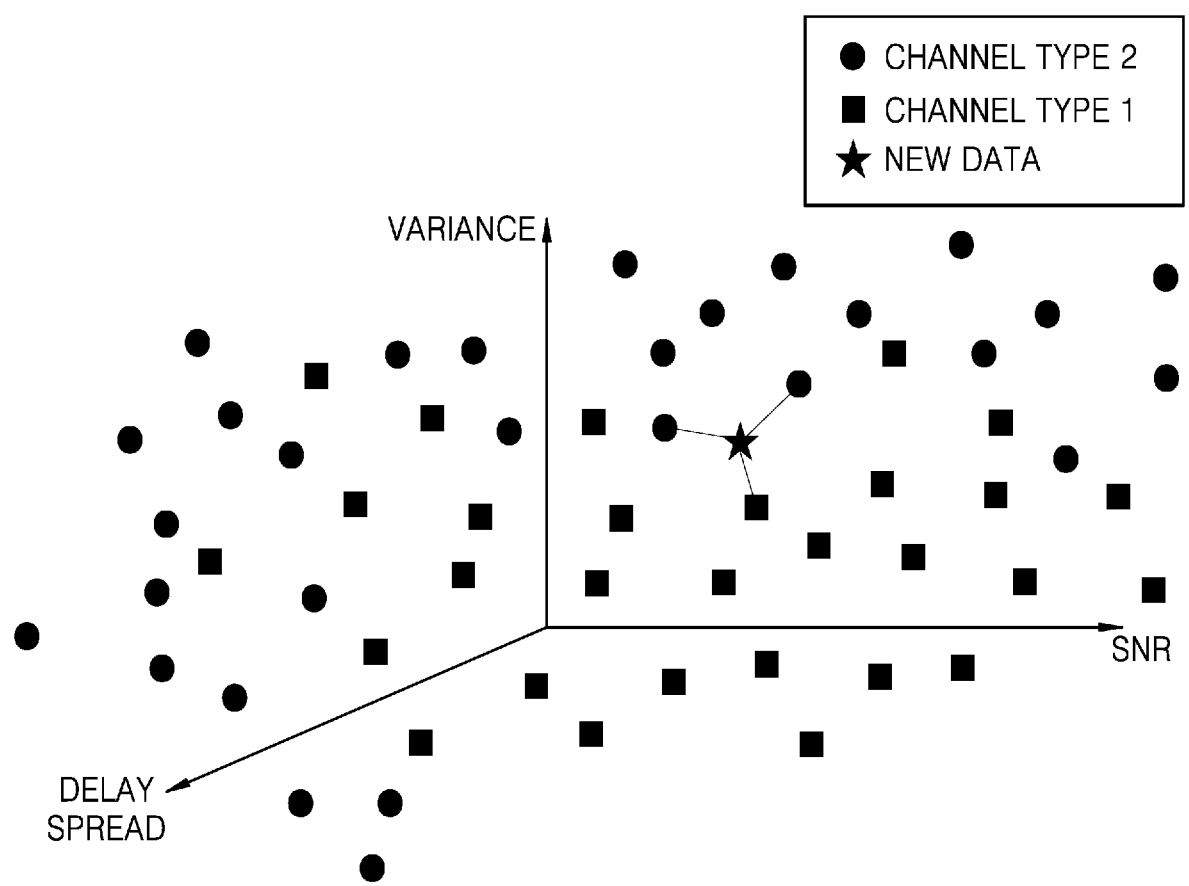
FIG. 7 is a diagram depicting a first machine learning algorithm, according to an embodiment.
Figure 8:
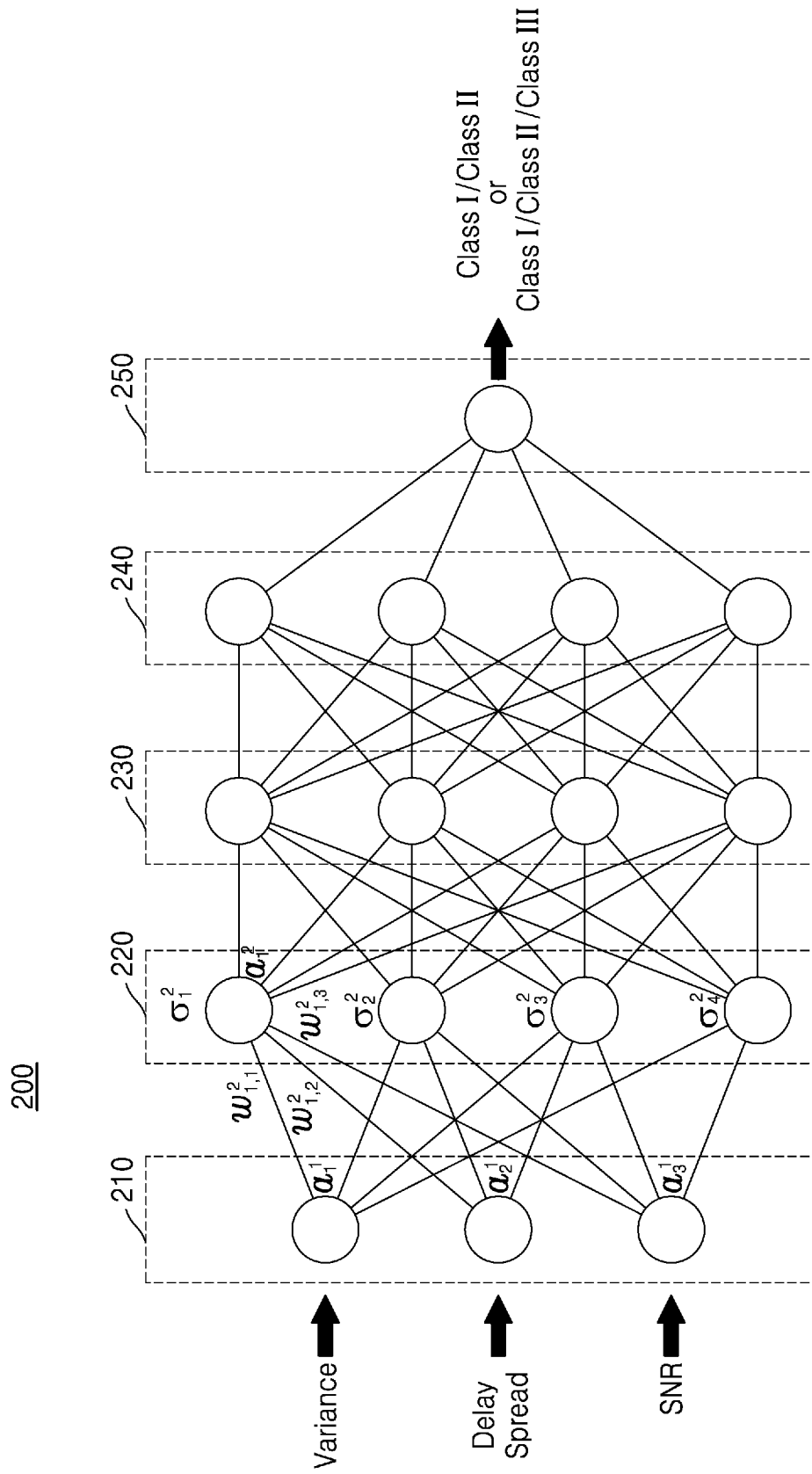
FIG. 8 is a diagram illustrating a first machine learning algorithm, according to another embodiment.

FIG. 6 is a flowchart for determining a channel class based on a first machine learning algorithm, according to an embodiment. FIGS. 6 to 8 are described with reference to FIG. 5.

A first machine learning algorithm, according to an embodiment, may include operations S141 to S144.

In operation S141, the beamformee 520 may obtain pieces of channel training data including pieces of first channel class data and pieces of second channel class data. In some embodiments, the beamformee 520 may obtain the pieces of channel training data based on a channel simulation result with the beamformer 510.

In operation S142, the beamformee 520 may determine K pieces of KNN data closest to channel characteristic data from among the pieces of channel training data, where K is a positive integer greater than zero (0). For example, the beamformee 520 may determine K pieces of KNN data closest to the channel characteristic data in a three-dimensional (3D) domain including an SNR of a channel, a variance of a channel frequency response, and a channel delay spread, as described with reference to FIG. 7.

In operation S143, the beamformee 520 may compare the number of pieces of first channel class data with the number of pieces of second channel class data from among the pieces of KNN data. For example, when K is three (3), the beamformee 520 may check channel classes of the pieces of KNN data, and may compare one first channel class with two second channel classes.

In operation S144, the beamformee 520 may determine a class of a channel corresponding to the channel characteristic data to be a class of a channel corresponding to a greater number as a comparison result. For example, when the number of second channel classes from among the pieces of KNN data is greater, the beamformee 520 may determine the class of the channel corresponding to the channel characteristic data to be a second channel class.

FIG. 7 is a diagram depicting a first machine learning algorithm, according to an embodiment.

FIG. 7 illustrates pieces of first channel class data, pieces of second channel class data, and channel characteristic data that is new data, in a 3D domain including an SNR of a channel, a variance of a channel frequency response, and a channel delay spread.

According to a KNN algorithm, when K is three (3), channel classes of pieces of KNN data closest to the channel characteristic data may be one piece of first channel class data and two pieces of second channel class data. Accordingly, because the number of second channel classes is greater than that of first channel classes from among the pieces of KNN data, the channel characteristic data may be determined to be a second channel class.

FIG. 8 is a diagram illustrating a first machine learning algorithm, according to an embodiment.

The beamformee 520 may determine a class of a channel by applying an artificial neural network algorithm to channel characteristic data as shown in FIG. 8. A method of determining a class of a channel by applying an artificial neural network algorithm is described with reference to FIG. 8.

The beamformee 520 may include an artificial neural network 200 as shown in FIG. 8. The artificial neural network 200 may have a structure including an input layer 210, hidden layers (e.g., first hidden layer 220, second hidden layer 230, and third hidden layer 240), and an output layer 250. The artificial neural network 200 may perform an operation based on received input data (e.g., a variance of a channel frequency response, a channel delay spread, and/or an SNR of a channel). For example, the artificial neural network 200 may determine a class of a channel based on an operation result.

The artificial neural network 200 may be and/or may include an n-layers neural network and/or a deep neural network (DNN) including two or more hidden layers. For example, as shown in FIG. 8, the artificial neural network 200 may be a DNN including the input layer 210, the first to third hidden layers 220 to 240, and the output layer 250. The DNN may include, but is not limited to, a convolutional neural network (CNN), a recurrent neural network (RNN), a deep belief network, a restricted Boltzmann machine, and the like.

Although, as shown in FIG. 8, the artificial neural network 200 includes five (5) layers (e.g., input layer 210, first hidden layer 220, second hidden layer 230, third hidden layer 240, and output layer 250), the present disclosure is not limited in this regard. That is, the artificial neural network 200 illustrated in FIG. 8 is merely an example, and the artificial neural network 200 may include more (e.g., six (6) or more layers) or fewer layers (e.g., four (4) or less layers). Also, the artificial neural network 200 may include layers having any of various structures different from that shown in FIG. 8.

Each of the layers (e.g., input layer 210, first hidden layer 220, second hidden layer 230, third hidden layer 240, and output layer 250) included in the artificial neural network 200 may include a plurality of neurons. The neurons may correspond to a plurality of artificial nodes, that may be known or referred to as processing elements (PEs), units, or similar terms. For example, as shown in FIG. 8, the input layer 210 may include three neurons (nodes), and each of the first to third hidden layers 220 to 240 may include four neurons (nodes). However, this is merely an example, and each of the layers included in the artificial neural network 200 may include any of various numbers of neurons (nodes).

The neurons included in the layers included in the artificial neural network 200 may be connected to each other to exchange data. One neuron may receive data from other neurons, may perform an operation on the data, and may output an operation result to other neurons.

An input and an output of each of the neurons (nodes) may be respectively referred to as an input activation and an output activation. That is, an activation may be a parameter that is an output of one neuron and an input of neurons included in a next layer. Each neuron may determine its activation based on activations and weights received from neurons included in a previous layer. A weight may refer to a parameter used to calculate an output activation of each neuron, and may be a value allocated to a connection between neurons.

Each neuron may be processed by a computational unit and/or a processing element that receives an input activation and outputs an output activation, and the input activation and the output activation of each neuron may be mapped. For example, $\sigma_j^i$ may represent an activation function of a $j^{th}$ neuron of an $i^{th}$ layer, and $w_{j,k}^i$ may represent a weight value from a $k^{th}$ neuron included in an $(i-1)^{th}$ layer to the $j^{th}$ neuron included in the $i^{th}$ layer. $\alpha_j^i$ may be referred to as an activation of the $j^{th}$ neuron of the $i^{th}$ layer, in other words, a post activation. The post activation $\alpha_j^i$ may be calculated by using Equation 12.

$$a_j^i = \sigma_j^i\left(\sum_k w_{j,k}^j \times a_k^{i-1}\right) \tag{Eq. 12}$$

As shown in FIG. 8, a post activation of a first neuron of the first hidden layer 220 may be expressed as $\alpha_1^2$. Also, $\alpha_1^2$ may have a value of $\alpha_1^2 = \sigma_1^2(w_{1,1}^2 \times \alpha_1^1 + w_{1,2}^2 \times \alpha_2^1 + w_{1,3}^2 \times \alpha_3^1)$, according to Equation 12. That is, a post activation may be a value obtained by applying an activation function to a sum of activations received from a previous layer. However, Equation 12 is merely an example illustrating an activation and a weight used to process data in a neural network, and the present disclosure is not limited thereto.

The artificial neural network 200 may perform the operations described above on the first to third hidden layers 220 to 240 and the output layer 250. For example, the artificial neural network 200 may determine a class of a channel based on a result of the operation. That is, in a case of binary-level classification, the artificial neural network 200 may determine a class of a channel as a first channel class or a second channel class. Alternatively or additionally, in a case of multi-level classification, the artificial neural network 200 may determine a class of a channel as a first channel class, a second channel class, or a third channel class.

FIGS. 9A and 9B illustrate tables describing subcarrier grouping information, according to an embodiment.

FIG. 9A illustrates subcarrier grouping information in a case of binary-level classification. FIG. 9B illustrates subcarrier grouping information in a case of multi-level classification.

Referring to FIG. 9A, in a case of a first channel class Class I, sixteen (16) subcarriers may be grouped to generate a feedback frame (e.g., $N_g = 16$). In an embodiment, the first channel class Class I may correspond to Ch.A of a WLAN system that conforms to the IEEE 802.11ac/ax/be standard. Alternatively or additionally, the first channel class Class I may refer to a frequency flat channel in which multipath fading may occur over a wide frequency band.

In contrast, in a case of a second channel class Class II, four (4) subcarriers may be grouped to generate a feedback frame (e.g., $N_g = 4$). The second channel class Class II may correspond to Ch.B, Ch.C, Ch.D, Ch.E, and Ch.F of the WLAN system that conforms to the IEEE 802.11ac/ax/be standard. Alternatively or additionally, the second channel class Class II may refer to a frequency selective channel in which multipath fading may occur in a specific frequency band.

Referring to FIG. 9B, in a case of a first channel class Class I, a total number $N_{ST}$ of subcarriers may be grouped to generate a feedback frame (e.g., $N_g = N_{ST}$). The first channel class Class I may correspond to Ch.A of a WLAN system that conforms to the IEEE 802.11ac/ax/be standard. Alternatively or additionally, the first channel class Class I may refer to a frequency flat channel.

In a case of a second channel class Class II, sixteen (16) subcarriers may be grouped to generate a feedback frame (e.g., $N_g = 16$). The second channel class Class II may correspond to Ch.B and Ch.C of the WLAN system that conforms to the IEEE 802.11ac/ax/be standard. Alternatively or additionally, the second channel class Class II may refer to a low frequency selective channel in which multipath fading may occur in a specific frequency band.

In a case of a third channel class Class III, four (4) subcarriers may be grouped to generate a feedback frame (e.g., $N_g = 4$). The third channel class Class III may correspond to Ch.D, Ch.E, and Ch.F of the WLAN system that conforms to the IEEE 802.11ac/ax/be standard. Alternatively or additionally, the third channel class Class III may refer to a high frequency selective channel in which multipath fading may occur in a narrower frequency band than in a low fine codebook.

Figures 10, 11:
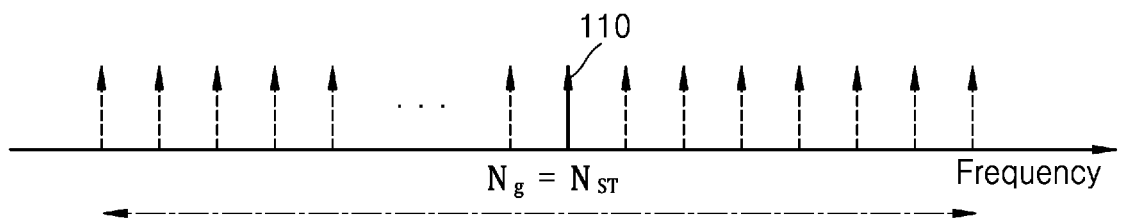
FIG. 10 is a diagram illustrating subcarrier grouping, according to an embodiment.
FIG. 11 is a diagram depicting the total number of subcarriers, according to an embodiment.

FIG. 10 is a diagram illustrating subcarrier grouping, according to an embodiment. FIG. 10 is described with reference to FIG. 1.

FIG. 10 is a diagram of a first channel class as described with reference to FIG. 9B. That is, as shown in FIG. 10, a total number $N_{ST}$ of subcarriers may be grouped to generate a feedback frame (e.g., $N_g = N_{ST}$). For example, the beamformee 20 may feed back quantization angle information corresponding to one subcarrier 110 from among the total number $N_{ST}$ of subcarriers to the beamformer 10.

FIG. 11 is a diagram illustrating the total number $N_{ST}$ of subcarriers according to a bandwidth of a channel, according to an embodiment. As shown in FIG. 11, the total number $N_{ST}$ of subcarriers may vary according to a bandwidth of a channel. For example, a total number $N_{ST}$ of subcarriers for a 20 MHz bandwidth may be 242 (e.g., $N_{ST} = 242$), a total number $N_{ST}$ of subcarriers for a 40 MHz bandwidth may be 484 (e.g., $N_{ST} = 484$), a total number $N_{ST}$ of subcarriers for a 80 MHz bandwidth may be 996 (e.g., $N_{ST} = 996$), a total number $N_{ST}$ of subcarriers for a 80+80 MHz bandwidth may be 1,992 (e.g., $N_{ST} = 1992$), and a total number $N_{ST}$ of subcarriers for a 160 MHz bandwidth may be 3,984 (e.g., $N_{ST} = 3984$).

Figure 12:
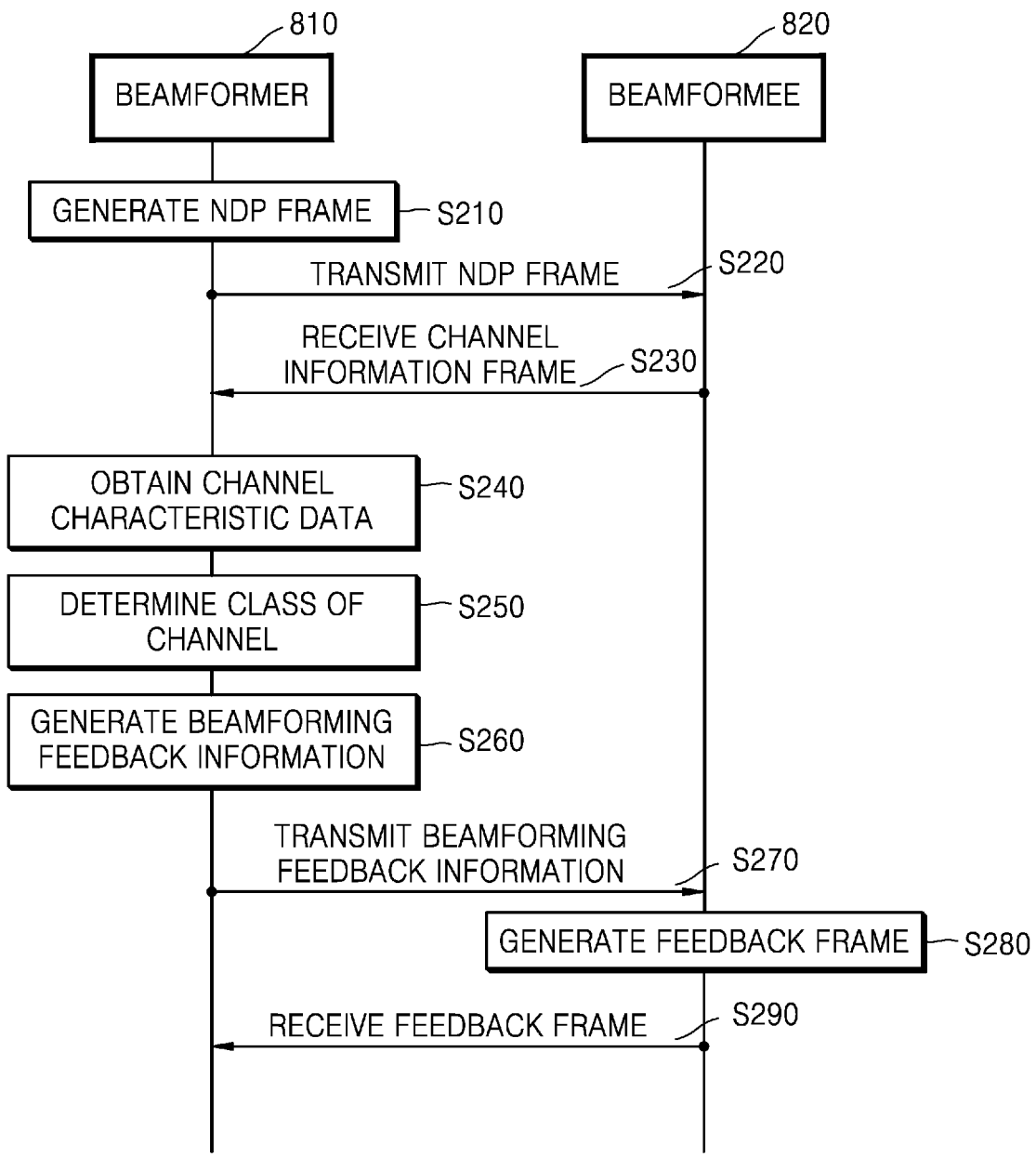
FIG. 12 illustrates signal exchange illustrating an operating method of a beamformer and a beamformee, according to an embodiment.

FIG. 12 illustrates an example of a signal exchange depicting an operating method of a beamformer and a beamformee, according to an embodiment. Beamformer 810 of FIG. 12 may include and/or may be similar in many respects to at least one of the beamformer 10 of FIG. 1 or the beamformer 510 described above with reference to FIGS. 5 and 6, and may include additional features not mentioned above. Beamformee 820 of FIG. 12 may include and/or may be similar in many respects to at least one of the beamformee 20 of FIG. 1 or the beamformee 520 described above with reference to FIGS. 5 and 6, and may include additional features not mentioned above. Consequently, repeated descriptions of the beamformer 810 and beamformee 820 described above with reference to FIGS. 1, 5, and 6 may be omitted for the sake of brevity.

The signal exchange of FIG. 12 may correspond to an operating method when the beamformer 810 generates beamforming feedback information (e.g., in a case of multi-user beamforming). That is, the signal exchange of FIG. 12 illustrates operations of the beamformer 810 as an access point and a beamformee 820 as a station over time. As shown in FIG. 12, the operating method of the beamformer 810 and the beamformee 820 may include a plurality of operations S210 to S290.

Referring to FIG. 12, in operation S210, the beamformer 810 may generate an NDP frame. The NDP frame may include a reference signal for channel estimation between the beamformer 810 and the beamformee 820.

In operation S220, the beamformer 810 may transmit the NDP frame to the beamformee 820.

In operation S230, the beamformer 810 may receive a channel information frame from the beamformee 820.

In operation S240, the beamformer 810 may obtain channel characteristic data based on the channel information frame. The channel characteristic data may include at least one of a variance of a channel frequency response, a channel delay spread, or an SNR of a channel. In operation S250, the beamformer 810 may determine a class of a channel by applying a second machine learning algorithm to the channel characteristic data. The second machine learning algorithm may refer to unsupervised learning of a machine learning to infer at least one function without training data. The second machine learning algorithm may be and/or include, for example, a K-mean algorithm as described with reference to FIG. 13. In an embodiment, the beamformer 810 may determine the class of the channel by applying the second machine learning algorithm to the channel characteristic data. For example, in a case of binary-level classification, the beamformer 810 may determine whether the class of the channel is a first channel class or a second channel class. Alternatively or additionally, in a case of multi-level classification, the beamformer 810 may determine whether the class of the channel is a first channel class, a second channel class, or a third channel class.

In operation S260, the beamformer 810 may generate beamforming feedback information based on a determination result of operation S250. The beamforming feedback information may include subcarrier grouping information and codebook size information.

In operation S270, the beamformer 810 may transmit the beamforming feedback information to the beamformee 820.

In operation S280, the beamformee 820 may generate a feedback frame according to the beamforming feedback information. For example, when the subcarrier grouping information has information corresponding to four (4), the beamformee 820 may generate a feedback frame by grouping four (4) subcarriers. Also, when the codebook size information has information corresponding to a fine codebook, the beamformee 820 may generate a feedback frame having a larger codebook size than in a coarse codebook. In some embodiments, the feedback frame may include pieces of quantization angle information corresponding to the channel characteristic data.

In operation S290, the beamformer 810 may receive the feedback frame generated in operation S280 from the beamformee 820.

Figure 13:
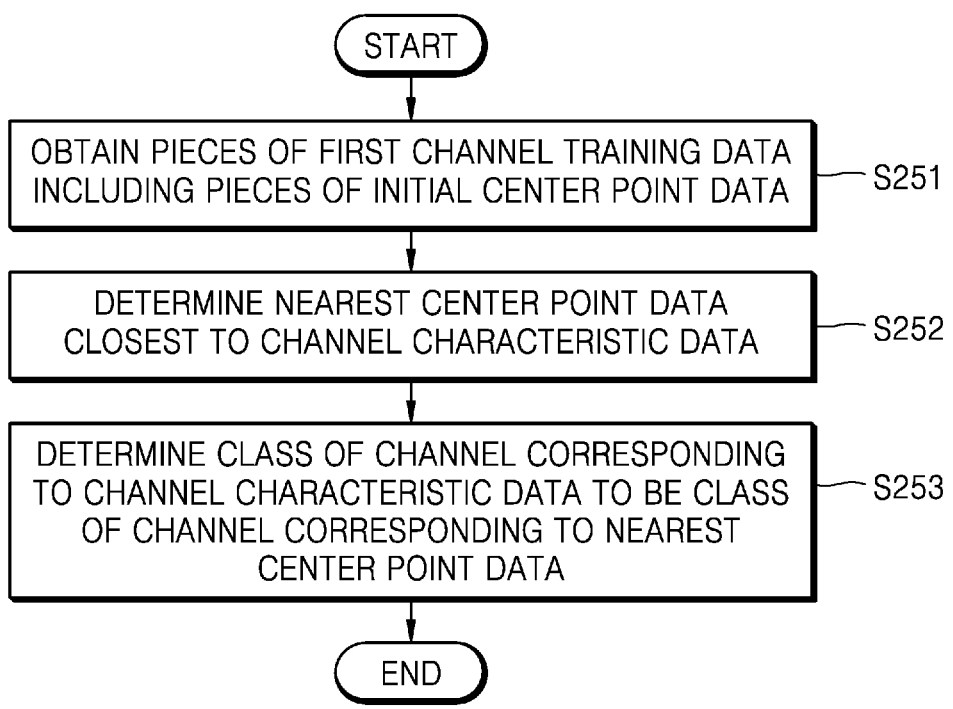
FIG. 13 is a flowchart depicting a channel class according to a second machine learning algorithm, according to an embodiment.
Figure 14:
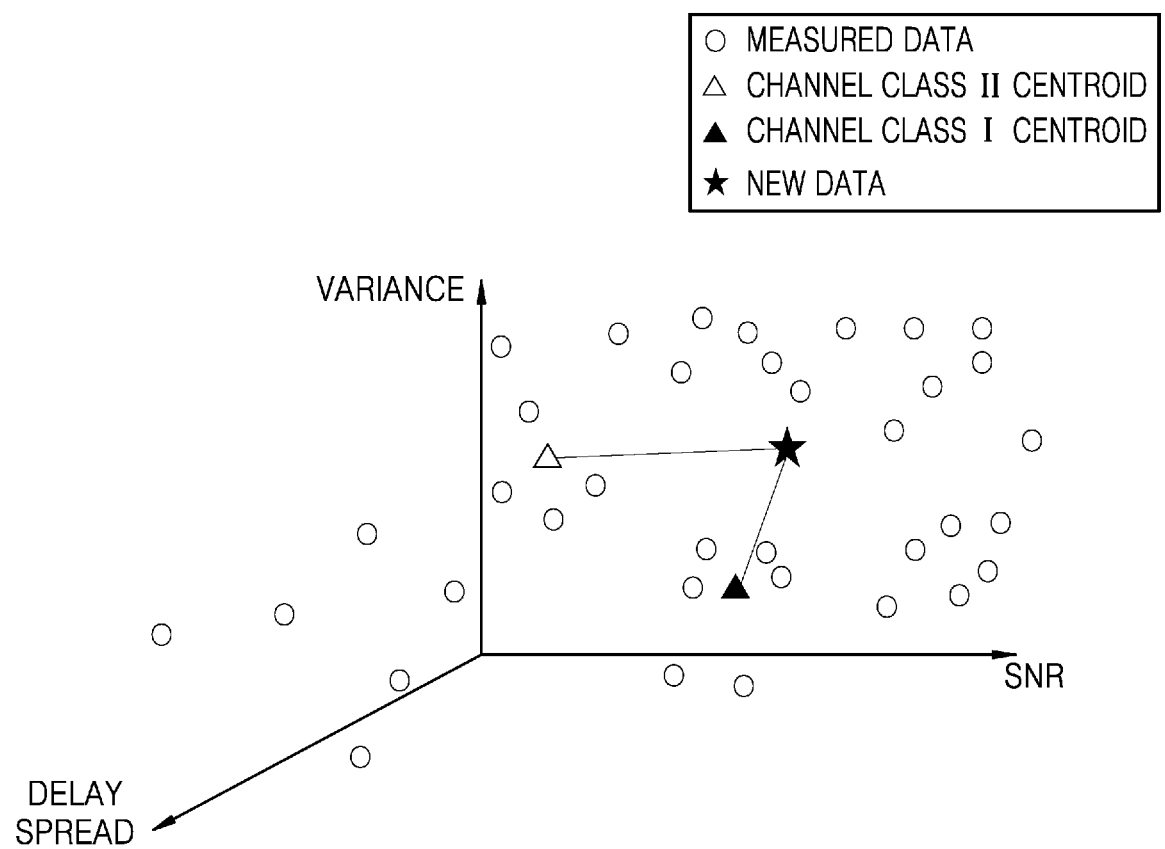
FIG. 14 is a diagram illustrating a second machine learning algorithm, according to an embodiment.

FIG. 13 is a flowchart for determining a channel class based on a second machine learning algorithm, according to an embodiment. FIGS. 13 and 14 are described with reference to FIG. 12.

A second machine learning algorithm may include operations S251 to S253.

In operation S251, the beamformer 810 may obtain pieces of first channel training data including pieces of initial center point data. The pieces of first channel training data may refer to pieces of data obtained when the beamformer 810 measures a channel with the beamformee 820. For example, the beamformer 810 may set an average of an arbitrary number of pieces of data from among pieces of measured data as initial first channel class center point data and initial second channel class center point data. The initial first channel class center point data and the initial second channel class center point data may be referred to as the pieces of initial center point data.

In operation S252, the beamformer 810 may determine nearest center point data closest to channel characteristic data. For example, as shown in FIG. 14, the beamformer 810 may determine the initial center point data closest to the channel characteristic data as nearest center point data in a 3D domain including an SNR of a channel, a variance of a channel frequency response, and a channel delay spread.

In operation S253, the beamformer 810 may determine a class of a channel corresponding to the channel characteristic data to be a class of a channel corresponding to the nearest center point data. For example, when the nearest center point data is the initial second channel class center point data, the beamformer 810 may determine the class of the channel corresponding to the channel characteristic data to be a second channel class.

In some embodiments, the second machine learning algorithm may further include an operation of updating pieces of center point data based on pieces of second channel training data obtained by adding the channel characteristic data to the pieces of first channel training data. For example, when the beamformer 810 determines the class of the channel corresponding to the channel characteristic data to be the second channel class, the beamformer 810 may update second channel class center point data to the pieces of second channel training data including the channel characteristic data.

FIG. 14 is a diagram illustrating a second machine learning algorithm, according to an embodiment.

FIG. 14 illustrates pieces of measured data, pieces of first channel class center point data, pieces of second channel class center point data, and channel characteristic data that is new data, in a 3D domain including an SNR of a channel, a variance of a channel frequency response, and a channel delay spread.

According to a K-mean algorithm, the beamformer 810 may set an initial first channel class center point data and an initial second channel class center point data by measuring a channel with the beamformee 820.

The beamformer 810 may determine a nearest initial center point data closest to channel characteristic data from among pieces of initial center point data. For example, when the initial second channel class center point data is the initial center point data closest to the channel characteristic data, the beamformer 810 may determine the nearest initial center point data to be the initial second channel class center point data.

The beamformer 810 may determine a class of a channel corresponding to the channel characteristic data to be a class of a channel corresponding to the nearest initial center point data. For example, when the nearest initial center point data is the initial second channel class center point data, the beamformer 810 may determine a class of a channel corresponding to the channel characteristic data to be a second channel class.

Figure 15:
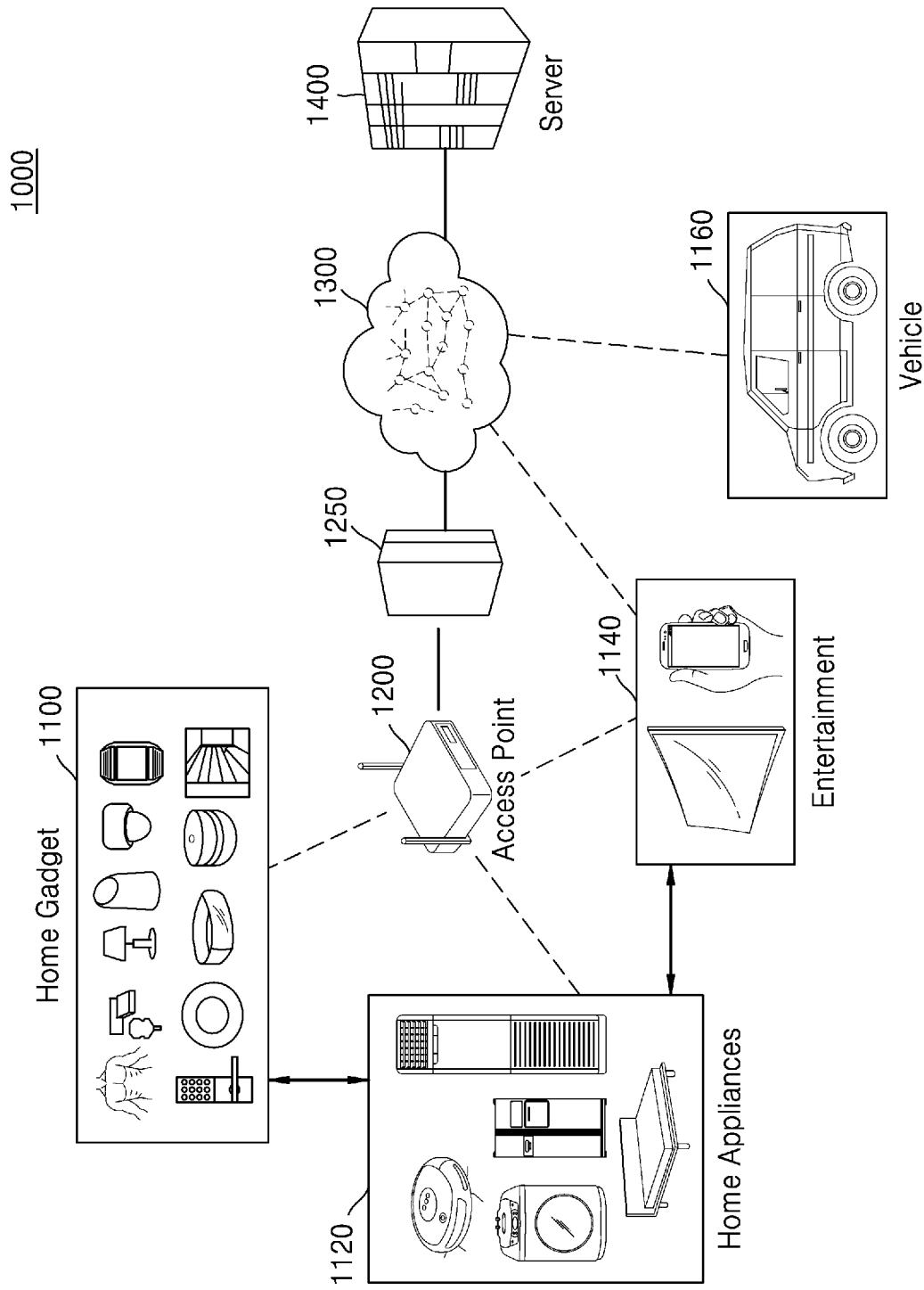
FIG. 15 is a conceptual diagram illustrating an Internet of things (IoT) network system, according to an embodiment.

FIG. 15 is a conceptual diagram illustrating an Internet of things (IoT) network system to which embodiments of the present disclosure may be applied.

Referring to FIG. 15, an IoT network system 1000 may include a plurality of IoT devices (e.g., home gadgets 1100, home appliances 1120, entertainment devices 1140, and vehicles 1160), an access point 1200, a gateway 1250, a wireless network 1300, and a server 1400. The IoT network system 1000 may refer to a network between objects using wired/wireless communication.

Each of the IoT devices 1100 to 1160 may form a group according to characteristics of each IoT device. For example, the IoT devices may be grouped into a home gadget group 1100, a home appliance/furniture group 1120, an entertainment group 1140, a vehicle group 1160, and/or the like. The plurality of IoT devices 1100, 1120, and 1140 may be connected to each other through a communication network and/or may be connected to other IoT devices through the access point 1200. In an embodiment, the access point 1200 may be provided in one IoT device. The gateway 1250 may change a protocol to connect the access point 1200 to an external wireless network 1300. That is, the IoT devices 1100, 1120, and 1140 may be connected to an external communication network 1300 through the access point 1200 and the gateway 1250. The external communication network 1300 may include the Internet and/or public network. The plurality of IoT devices 1100, 1120, 1140, and 1160 may be connected to the server 1400 that may provide a certain service through the wireless network 1300, and a user may use the service through at least one of the plurality of IoT devices 1100, 1120, 1140, or 1160.

According to embodiments, the plurality of IoT devices 1100 to 1160 may adaptively adjust beamforming feedback resources by using machine learning as described above with reference to FIGS. 1 to 14. Accordingly, the IoT devices 1100 to 1160 may efficiently adjust feedback frame resources, thereby potentially reducing beamforming feedback overhead.

Embodiments have been described with reference to the drawings. While embodiments have been described by using specific terms, the terms have merely been used to explain the present disclosure and should not be construed as limiting the scope of the present disclosure defined by the claims. Hence, it may be understood by one of ordinary skill in the art that various modifications and other equivalent embodiments may be made therefrom. Accordingly, the scope of the present disclosure should be defined by the following claims.

What is claimed is:

1. An operating method of a first apparatus communicating with a second apparatus through a wireless local area network (WLAN), the operating method comprising:
   obtaining channel characteristic data with the second apparatus based on a null data packet (NDP) frame received from the second apparatus;
   generating beamforming feedback information and a feedback frame based on a class of a channel determined by applying a machine learning algorithm to the channel characteristic data; and
   transmitting the feedback frame to the second apparatus.

2. The operating method of claim 1, wherein the channel characteristic data comprises at least one of a variance of a channel frequency response of the channel, a channel delay spread of the channel, or a signal-to-noise ratio (SNR) of the channel.

3. The operating method of claim 1, wherein the class of the channel comprises a first channel class and a second channel class, and
   wherein a second multipath fading of the second channel class is greater than a first multipath fading of the first channel class.

4. The operating method of claim 1, wherein the obtaining the channel characteristic data comprises:
   identifying the NDP frame;
   extracting pieces of information included in the NDP frame; and
   obtaining the channel characteristic data of the second apparatus based on the extracted pieces of information.

5. The operating method of claim 1, wherein the generating the beamforming feedback information and the feedback frame comprises:
   obtaining pieces of channel training data comprising first pieces of first channel class data and second pieces of second channel class data;
   determining K pieces of K-nearest neighbor data closest to the channel characteristic data from among the pieces of channel training data, K being a positive integer greater than zero;
   comparing a first number of pieces of the first channel class data from among the K pieces of K-nearest neighbor data with a second number of pieces of second channel class data from among the K pieces of K-nearest neighbor data; and
   determining, based on the comparing, the class of the channel corresponding to the channel characteristic data to be the class of the channel corresponding to a greater number between the first number of pieces and the second number of pieces.

6. The operating method of claim 1, wherein the generating the beamforming feedback information and the feedback frame comprises determining the class of the channel by applying an artificial neural network algorithm to the channel characteristic data.

7. The operating method of claim 1, wherein the beamforming feedback information comprises subcarrier grouping information corresponding to a number of subcarriers grouped from among consecutive subcarriers.

8. The operating method of claim 1, wherein the feedback frame comprises pieces of quantization angle information corresponding to the channel characteristic data, and
   wherein the beamforming feedback information comprises codebook size information corresponding to a number of bits of the pieces of quantization angle information.

9. An operating method of a second apparatus communicating with a first apparatus through a wireless local area network (WLAN), the operating method comprising:
   transmitting a null data packet (NDP) frame to the first apparatus;
   receiving a channel information frame from the first apparatus;
   obtaining channel characteristic data with the first apparatus based on the channel information frame;
   generating beamforming feedback information based on a class of a channel determined by applying a machine learning algorithm to the channel characteristic data; and
   transmitting the beamforming feedback information to the first apparatus.

10. The operating method of claim 9, wherein the channel characteristic data comprises at least one of a variance of a channel frequency response of the channel, a channel delay spread of the channel, or a signal-to-noise ratio (SNR) of the channel.

11. The operating method of claim 9, wherein the class of the channel comprises a first channel class and a second channel class, and
   wherein a second multipath fading of the second channel class is greater than a first multipath fading of the first channel class.

12. The operating method of claim 9, wherein the generating the beamforming feedback information comprises:
   obtaining pieces of first channel training data comprising pieces of initial center point data;
   determining nearest center point data closest to the channel characteristic data; and
   determining the class of the channel corresponding to the channel characteristic data to be the class of the channel corresponding to the nearest center point data.

13. The operating method of claim 12, wherein the generating the beamforming feedback information further comprises updating pieces of center point data based on the pieces of first channel training data and pieces of second channel training data comprising the channel characteristic data.

14. The operating method of claim 9, wherein the beamforming feedback information comprises subcarrier grouping information corresponding to a number of subcarriers grouped from among consecutive subcarriers.

15. The operating method of claim 9, further comprising:
receiving, from the first apparatus, a feedback frame comprising pieces of quantization angle information corresponding to the channel characteristic data,
wherein the beamforming feedback information comprises codebook size information corresponding to a number of bits of the pieces of quantization angle information.

16. The operating method of claim 9, wherein the WLAN is a multi-user multi-input multi-output (MU-MIMO) system.

17. A first apparatus communicating with a second apparatus through a wireless local area network (WLAN), the first apparatus comprising:
a processing circuit configured to obtain channel characteristic data based on a null data packet (NDP) frame received from the second apparatus, and generate beamforming feedback information and a feedback frame based on a class of a channel determined by applying a machine learning algorithm to the channel characteristic data,
wherein the processing circuit is further configured to control a transceiver to transmit the feedback frame to the second apparatus.

18. The first apparatus of claim 17, wherein the channel characteristic data comprises at least one of a variance of a channel frequency response of the channel, a channel delay spread of the channel, or a signal-to-noise ratio (SNR) of the channel.

19. The first apparatus of claim 17, wherein the class of the channel comprises a first channel class and a second channel class, and
wherein a second multipath fading of the second channel class is greater than a first multipath fading of the first channel class.

20. The first apparatus of claim 17, wherein the feedback frame comprises pieces of quantization angle information corresponding to the channel characteristic data, and
wherein the beamforming feedback information comprises codebook size information corresponding to a number of bits of the pieces of quantization angle information.

\* \* \* \* \*